（12）United States Patent
Grobbe et al.

(10) Patent No.: US 11,307,324 B2
(45) Date of Patent: Apr. 19, 2022

(54) SYSTEMS AND METHODS FOR DETECTING SEISMO-ELECTROMAGNETIC CONVERSION

(71) Applicant: Massachusetts Institute of Technology, Cambridge, MA (US)

(72) Inventors: Niels Grobbe, Honolulu, HI (US); Aime Fournier, Boulder, CO (US); Laurent Demanet, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 414 days.

(21) Appl. No.: 16/361,073

(22) Filed: Mar. 21, 2019

(65) Prior Publication Data
US 2019/0293832 A1    Sep. 26, 2019

Related U.S. Application Data

(60) Provisional application No. 62/647,471, filed on Mar. 23, 2018, provisional application No. 62/646,328, filed on Mar. 21, 2018.

(51) Int. Cl.
*G01V 3/38* (2006.01)
*E21B 44/00* (2006.01)
(Continued)

(52) U.S. Cl.
CPC ............... *G01V 3/38* (2013.01); *E21B 44/00* (2013.01); *E21B 47/06* (2013.01); *G01V 1/282* (2013.01);
(Continued)

(58) Field of Classification Search
CPC ............... E21B 44/00; E21B 47/06; G01V 2210/1216; G01V 1/282; G01V 2210/6163; G01V 2210/679; G01V 3/12; G01V 3/38
See application file for complete search history.

(56) References Cited

U.S. PATENT DOCUMENTS

| 4,598,593 | A | 7/1986 | Sheen et al. |
| 5,130,951 | A | 7/1992 | Kingman |

(Continued)

FOREIGN PATENT DOCUMENTS

| EP | 1 249 208 A1 | 10/2002 |
| EP | 0 525 124 A1 | 3/2003 |

(Continued)

OTHER PUBLICATIONS

International Search Report and Written Opinion dated Jun. 5, 2019 in connection with International Application No. PCT/US2019/023456.

(Continued)

*Primary Examiner* — Elias Desta
(74) *Attorney, Agent, or Firm* — Wolf, Greenfield & Sacks, P.C.

(57) ABSTRACT

Drilling systems and related methods are disclosed. A drilling systems may include a tool configured to be positioned at an end of a drill string adjacent a drill bit, and the tool may be configured to detect localized seismo-electromagnetic conversion from one or more predetermined positions within a medium ahead of the drill bit. The tool may include two or more pressure sources configured to generate focused acoustic and/or elastic energy at the one or more predetermined positions to generate the localized seismo-electric conversion.

32 Claims, 8 Drawing Sheets

(51) Int. Cl.
*E21B 47/06* (2012.01)
*G01V 1/28* (2006.01)
*G01V 3/12* (2006.01)

(52) U.S. Cl.
CPC ........ *G01V 3/12* (2013.01); *G01V 2210/1216* (2013.01); *G01V 2210/6163* (2013.01); *G01V 2210/679* (2013.01)

(56) References Cited

U.S. PATENT DOCUMENTS

| | | | |
|---|---|---|---|
| 5,151,882 A | | 9/1992 | Kingman |
| 5,173,879 A | | 12/1992 | Cung et al. |
| 5,400,299 A | | 3/1995 | Trantham |
| 5,416,750 A | | 5/1995 | Doyen et al. |
| 5,511,038 A | | 4/1996 | Angeleri et al. |
| 5,994,690 A | | 11/1999 | Kulkarni et al. |
| 7,694,735 B2 | * | 4/2010 | Haheim ............... G01V 11/005 166/250.11 |
| 7,911,879 B2 | | 3/2011 | Jogi et al. |
| 8,544,564 B2 | | 10/2013 | Moore et al. |
| 10,616,008 B2 | | 4/2020 | Pisupati et al. |
| 2002/0112888 A1 | * | 8/2002 | Leuchtenberg ......... E21B 21/08 175/48 |
| 2002/0120401 A1 | | 8/2002 | Macdonald et al. |
| 2004/0124009 A1 | | 7/2004 | Hoteit et al. |
| 2007/0285274 A1 | | 12/2007 | Esmersoy |
| 2007/0294036 A1 | | 12/2007 | Strack et al. |
| 2008/0025521 A1 | | 1/2008 | Morise et al. |
| 2008/0281523 A1 | | 11/2008 | Dahl et al. |
| 2009/0006058 A1 | | 1/2009 | King |
| 2012/0068712 A1 | | 3/2012 | Taherian et al. |
| 2013/0116926 A1 | | 5/2013 | Rodney et al. |
| 2013/0215717 A1 | | 8/2013 | Hofland et al. |
| 2014/0104980 A1 | | 4/2014 | Sava et al. |
| 2014/0121971 A1 | | 5/2014 | Hanak et al. |
| 2016/0245779 A1 | | 8/2016 | Khalaj Amineh et al. |
| 2016/0334270 A1 | | 11/2016 | Van Manen et al. |
| 2017/0307772 A1 | | 10/2017 | Jutila et al. |
| 2018/0171772 A1 | | 6/2018 | Rodney |
| 2019/0078430 A1 | | 3/2019 | Fouda et al. |
| 2019/0349223 A1 | | 11/2019 | Pisupati et al. |
| 2020/0213164 A1 | | 7/2020 | Pisupati et al. |
| 2020/0386097 A1 | | 12/2020 | Fournier et al. |

FOREIGN PATENT DOCUMENTS

| | | |
|---|---|---|
| WO | WO 90/03616 A1 | 4/1990 |
| WO | WO 2006/045340 A1 | 5/2006 |
| WO | WO 2017/160162 A1 | 9/2017 |

OTHER PUBLICATIONS

PCT/US2019/023456, Jun. 5, 2019, International Search Report and Written Opinion.
U.S. Appl. No. 16/817,089, filed Mar. 12, 2020, Pisupati et al.
International Search Report and Written Opinion dated Jul. 29, 2019 in connection with International Application No. PCT/US2019/031481.
International Search Report and Written Opinion dated Dec. 30, 2019 in connection with International Application No. PCT/US2019/054945.

* cited by examiner

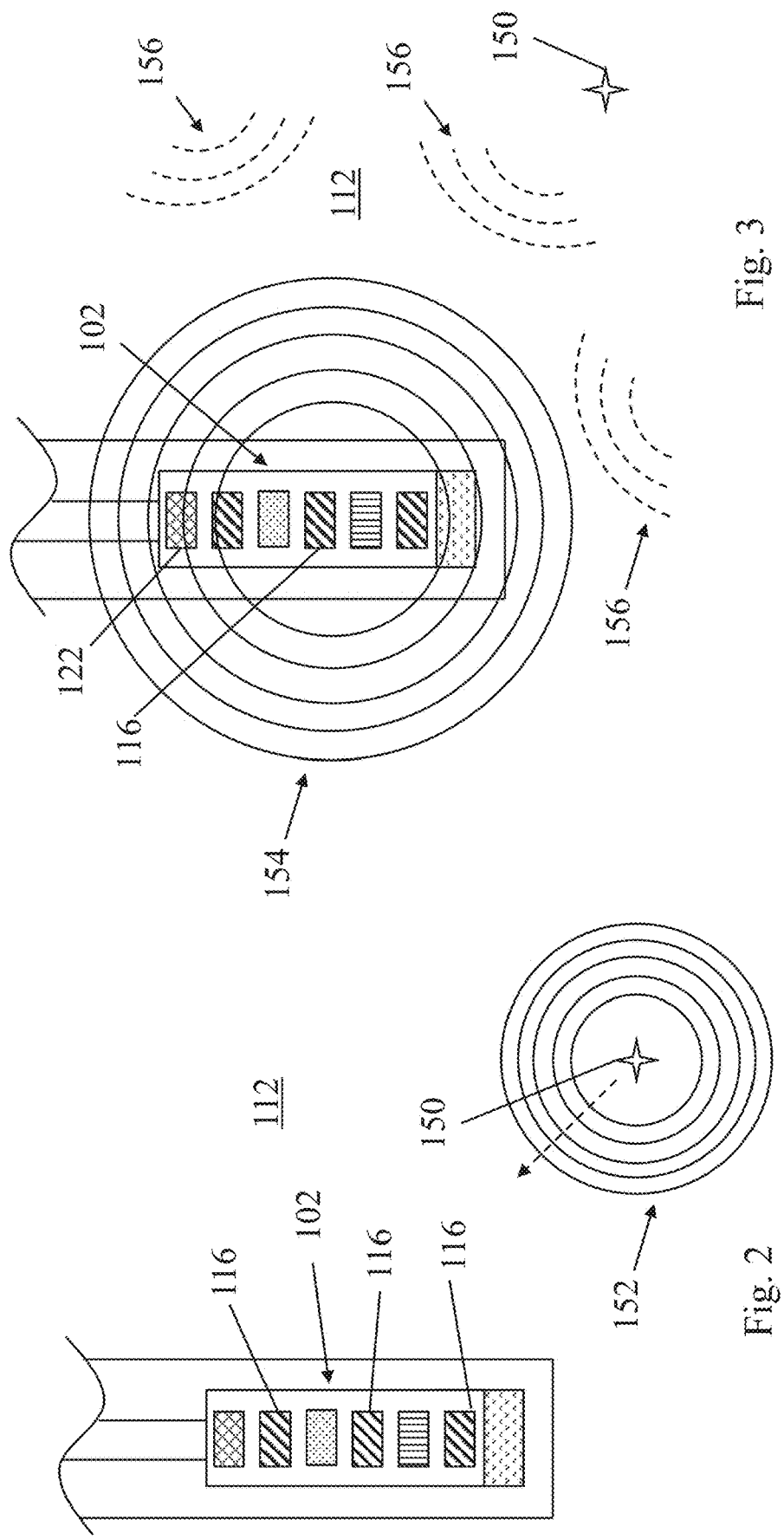

SYSTEMS AND METHODS FOR DETECTING SEISMO-ELECTROMAGNETIC CONVERSION

CROSS-REFERENCE TO RELATED APPLICATIONS

This application claims the benefit under 35 U.S.C. § 119(e) of U.S. provisional application Ser. No. 62/646,328, filed Mar. 21, 2018, and U.S. provisional application Ser. No. 62/647,471, filed Mar. 23, 2018, the disclosure of each of which are incorporated by reference in their entirety.

FIELD

Disclosed embodiments are related to systems and methods for detecting seismo-electromagnetic conversion within a medium, for example, during a drilling operation.

BACKGROUND

A wide variety of drilling operations are performed in diverse types of media. For example, conventional drilling operations include oil and gas operations, $CO_2$ sequestration and injection operations, and various fresh water operations. Often, prior to commencing a drilling operation, a survey of the medium to be drilled is conducted to assess the properties of the medium. Such surveying operations are typically done with surface-based measurements of the medium where seismic measurements are made using seismic sources and sensors positioned on the surface above the medium.

SUMMARY

In one embodiment, a drilling system comprises a tool configured to be positioned at an end of a drill string, one or more pressure sources positioned within the tool, and a controller operatively coupled to the one or more pressure sources. The controller is configured to control the one or more pressure sources to emit acoustic and/or elastic energy into a medium surrounding the tool such that the acoustic and/or elastic energy is focused at one or more predetermined positions within the medium. The drilling system further includes a sensor positioned within the tool. The sensor is configured to detect an electromagnetic or electrostatic signal generated by seismo-electromagnetic or seismo-electric conversion at the one or more predetermined positions.

In another embodiment, a method comprises determining propagation of acoustic and/or elastic waveforms from one or more predetermined positions in a medium based on a predetermined acoustic and/or elastic model of the medium and obtaining modeled signals at locations of one or more pressure sources positioned within a tool based on the determined propagation of acoustic and/or elastic waveforms. The method further comprises time-reversing the modeled signals to calculate a time-reversed signal for each location of the of the two or more pressure sources, and emitting the time-reversed signal from each of the two or more pressure sources to generate focused acoustic and/or elastic energy at each of the one or more predetermined positions.

In a further embodiment, a method comprises emitting acoustic and/or elastic energy into a medium from at least one of two or more pressure sources positioned within a tool attached to an end of a drill string to generate reflected acoustic and/or elastic signals from the medium and measuring the reflected acoustic and/or elastic signals with one or more pressure sensors positioned within the tool. The method further comprises obtaining focusing waveforms based on the reflected acoustic and/or elastic signals, and emitting the focusing waveforms into the medium from at least two of the two or more pressure sources to generate focused acoustic and/or elastic energy at each of one or more predetermined positions within the medium.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 2 is a schematic representation of a portion of a drilling system illustrating modelled propagation of seismic waves from a predetermined position towards a tool, according to some embodiments;

FIG. 3 is a schematic representation of a portion of a drilling system illustrating seismic waves emitted from a tool and reflected waves from a medium, according to some embodiments;

DETAILED DESCRIPTION

Figure 1:
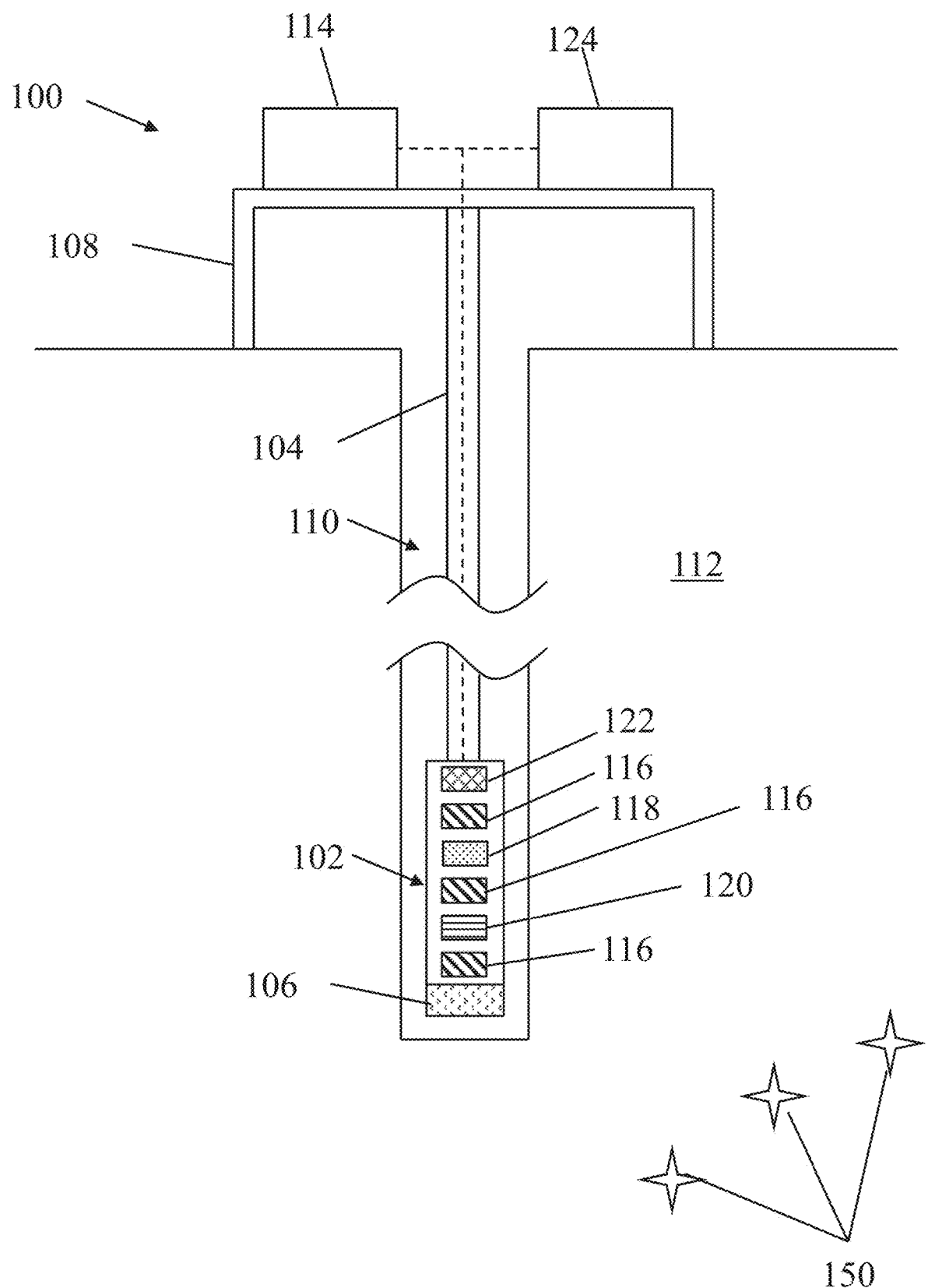
FIG. 1 is a schematic representation of one embodiment of a drilling system.

The inventors have appreciated that drilling into a medium having unknown and/or variable properties may carry associated uncertainties for a drilling operation, which may impact the cost and/or predictability of the operation. Properties that may be important during a drilling operation may include, but are not limited to, anomalously high or low pore fluid pressures, high temperatures, weak formations, faults, fractures, and other properties associated with formations within the medium. However, in conventional drilling systems, many of these medium properties cannot be characterized before drilling into the medium. For example, when drilling in depleted reservoirs, one significant challenge results from the unknown pore pressure distribution in the medium, since the actual pore pressures can only be measured in situ when a drill bit has already penetrated the medium and one or more sensors on a drill string are in contact with the pore fluid. Moreover, in other applications, existing approaches for characterizing a medium may involve large scale operations such as drilling multiple bore holes around a region to be characterized to facilitate placement of various seismic sources and sensors. Accordingly, such approaches may not be cost effective for many drilling operations and/or may not suitable for providing information about the medium during the course of a drilling operation.

In view of the foregoing, the inventors have recognized and appreciated numerous benefits associated with drilling systems and related methods that can provide information related to one or more properties of a heterogeneous medium. For example, in one embodiment, the systems and methods described herein may provide such information for a region of the medium ahead of a drill bit or tool, including during a drilling operation. According to some aspects, the systems and methods described herein may include a tool configured to be positioned at an end of a drill string (i.e., within a borehole) that may facilitate measuring signals corresponding to one or more properties of the medium at one or more predetermined positions, such as ahead of a drill bit (e.g. in a system including a drill bit or similar tool assembly), including during a drilling operation. For example, in some embodiments, a tool may include two or more pressure sources that are operated in conjunction with one another to focus acoustic and/or elastic energy at one or more predetermined positions within the medium to induce a response in the medium that can be measured by one or more corresponding sensors located within the tool as described further below. In this manner, the presently disclosed embodiments may provide localized information about the medium (e.g., information related to pore pressures ahead of a drill bit) that can be used for more reliable risk assessment and mitigation, and/or more accurate in situ sensing of medium properties compared to conventional approaches.

While some the embodiments described herein may include a drill bit (or similar tool arrangement configured to form a borehole or similar structure in a medium), it should be understood that the disclosed systems also may be embodied as sensing tools that do not include a drill bit. For example, such embodiments of sensing tools may be used in connection with a drilling operation (e.g., to provide information related to the medium being drilled), and/or may be used in non-drilling applications, such as for geological surveying applications (including data acquisition form the surface of the Earth).

In some embodiments, the drilling systems and methods described herein may be used to guide and/or control one or more aspects of a drilling operation. For example, in some applications, the drilling systems described herein may generate a drilling risk metric based on a measured signal from a medium and/or it may determine a property of the medium, and the drilling operation may be adjusted based on this information. For instance, a measurement indicating a medium property (e.g., a pore pressure) differs from an expected value in a region ahead of a drill bit may correspond to a higher drilling risk in that region. In response to identifying such a risk, the drilling operation may be adjusted to avoid the high risk region. In such an instance, one or more parameters of the drilling operation may be adjusted to accommodate for the varying properties in the region. Alternatively, the drilling operation may be temporarily suspended, and/or an alert may be output to an operator regarding the sensed operating condition. Depending on the particular embodiment, such control of the drilling operation may be carried out automatically or manually. For example, a drilling system may include a controller that automatically adjusts the one or more parameters of the drilling operation and/or automatically suspends the drilling operation in response to the determined drilling risk metric and/or medium property. In other embodiments, information such as the drilling risk metric, a property of the medium, a difference of a property of the medium relative to an expected medium property, or any other appropriate type of information may be output to an operator. Based on this information, the operator may then manually adjust one or more parameters of the drilling operation.

Some aspects described herein may utilize seismo-electromagnetic conversion within a medium to assess one or more properties of a medium. As used herein, seismo-electromagnetic conversion may generally refer to the coupling between mechanical waves (e.g., acoustic waves, elastic waves, poroelastic waves, seismic waves, pressure waves, shear waves, etc.) propagating within the medium and electromagnetic wavefields, and conversion of such mechanical waves into electromagnetic fields. As explained in more detail below, this conversion may result from charge separation that occurs when the seismic waves encounter interfaces within the medium, such as between porous layers having different properties (e.g., different pore pressures or viscosities). The inventors have appreciated that focusing seismic waves at one or more positions ahead of a drill bit in a drilling system may cause localized seismo-electromagnetic conversion at the one or more positions which may generate electromagnetic signals that can be measured via sensors positioned on a drill string. Due to the acoustic and/or elastic energy (and in some instances poroelastic energy) of the seismic waves being focused on the one or more predetermined positions, the magnitude of the seismic waves at the one or more predetermined positions may be greater than in other portions of the medium. Accordingly, the resulting electromagnetic signal may be dominated by the seismo-electromagnetic effect at those one or more predetermined positions. Further, if the applied waveforms are controlled to focus the seismic waves on the one or more points in a sequential manner, the resulting electromagnetic signal may also include separate corresponding discrete signals that may be paired with the corresponding predetermined positions to determine properties of the surrounding medium at each of those positions individually. In either case, such electromagnetic signals can be used to characterize one or more properties of the medium at the one or more positions and/or to generate a drilling risk metric as noted above.

As used herein acoustic and/or elastic energy and/or waves propagating within a medium may refer to any of a number of types of seismic waves that may propagate through a medium such as a portion of earth. Such waves may include pressure waves (P-waves, including fast and slow P-waves), which are longitudinal compression waves and shear waves (S-waves), which are transverse waves. In some instances, acoustic energy and/or acoustic waves may refer to only longitudinal pressure waves (i.e., compression waves), while elastic energy and/or elastic waves may refer to a combination of pressure waves and shear waves (including, for example, in a poroelastic formulation).

As used herein focusing seismic waves, waveforms, and/or energies, which may include acoustic, elastic, poroelastic, pressure, shear, and/or other appropriate type of wave, waveform and/or energy, at a particular position may refer to the combination of wave interference and/or reflections of waves that may occur within in a medium to create a desired waveform with a predetermined magnitude and combination of acoustic and/or elastic waveforms at a specific location. For example, a magnitude of the waveform may be greater at the predetermined location at a particular point in time as compared to surrounding portions of the medium. Thus, the waveforms, and corresponding energies, emitted by the two or more pressure sources of a tool may be considered to be focused on this location at a predetermined point in time. Moreover, as used herein, acoustic and/or elastic energy or waves refers to any suitable combination of acoustic, elastic, poroelastic, pressure, and/or shear energy or waves.

In one embodiment, a drilling system may include a tool configured to be positioned at an end of a drill string. For example, the drilling system may include a drill bit at the end of the drill string to form a borehole in a medium, and the tool may be positioned at the end of the drill string adjacent the drill bit. The tool may include two or more pressure sources configured to emit acoustic and/or elastic energy (i.e., seismic waves) into the medium. The pressure sensors may be operatively coupled to a controller configured to control the operation of the two or more pressure sources. In particular, the controller may operate the two or more pressure sources such that the acoustic and/or elastic energy emitted by the pressure sources is focused at one or more predetermined positions within the medium, such as at one or more regions ahead of the drill bit. The tool may further include one or more sensors configured to detect an electromagnetic signal generated by seismo-electromagnetic conversion at the one or more predetermined positions. Additionally, in some embodiments, the tool may further include one or more pressure sensors configured to detect acoustic and/or elastic signals from the medium. As described in more detail below, such signals may include reflected acoustic and/or elastic waves that may be used by the controller to facilitate focusing of the acoustic and/or elastic energy emitted by the pressure sources.

As noted above, a controller of a drilling system may be configured to control two or more pressure sources to emit acoustic and/or elastic energy such that the emitted energy is focused at one or more predetermined positions within a medium ahead of a drill bit of the drilling system. In particular, the controller may be configured to determine waveforms for the acoustic and/or elastic energy to be emitted from the pressure sources to achieve such focusing. In some embodiments, the controller may determine the waveforms using time-reversal focusing based on a model of acoustic and/or elastic wave propagation within the medium, such as a model of wave velocities within the medium. Such a model may be obtained prior to a drilling operation, for example, by full-waveform inversion of surface-acquired acoustic and/or elastic data, or by another suitable seismic imaging technique. In some instances, a model obtained prior to commencing a drilling operation may be updated during the drilling operation based on measured reflected acoustic and/or elastic signals, as described below. Moreover, in some applications, a model of the medium may be obtained based on measurements conducted from within a borehole, such as by measuring reflected seismic waves emitted from the tool within the borehole.

Once a model of the medium is obtained, the controller may use the model to determine propagation of desired acoustic and/or elastic waveforms from the one or more predetermined positions through the medium towards positions of the pressure sources in the tool, for example by simulating the propagation of the waveforms through the modeled medium. Based on the propagated waveforms, the controller may obtain a modeled acoustic and/or elastic signal at the locations of each of the two or more pressure sources. These modeled signals may be viewed as seismic waveforms that are propagating backwards in time. Thus, to obtain waveforms that may be emitted by the two or more pressure sources of a system to generate the desired acoustic and/or elastic waveforms at the one or more predetermined positions, the controller of a system may time-reverse the modeled signals at the location of each of the pressure sources to calculate a time-reversed signal for each of the pressure sources. In other words, the timing of the modeled signals may be reversed such that they correspond to signals that propagate forwards in time towards the one or more predetermined positions. Subsequently, the controller may operate each of the two or more pressure sources to emit acoustic and/or elastic waveforms into the medium according to the time-reversed signals for each pressure source. In this manner, the acoustic and/or elastic waveforms emitted from each pressure source may interact with one another at the at the one or more predetermined positions such that they are focused on these positions to generate a combined seismic waveform with a desired magnitude at one or more predetermined points in time. These focused waveforms may be sufficient to cause localized seismo-electromagnetic conversion at the one or more predetermined positions at the corresponding one or more predetermined points in time that may be sensed by one or more sensors.

In other embodiments, instead of relying on a model of the medium and time-reversal focusing to determine waveforms that focus at one or more predetermined positions within the medium, a controller of a drilling system may utilize a data-driven approach to determine focusing waveforms that focus at the one or more predetermined positions at one or more predetermined times when emitted from two or more pressure sources coupled to the controller. In particular, the controller may operate at least one pressure source of a tool at an end of a drill string to emit acoustic and/or elastic energy into the medium. The acoustic and/or elastic energy may be reflected by the medium back towards the tool, and the reflected acoustic and/or elastic energy may be detected by one or more pressure sensors positioned within the tool. Based on the measured reflected signals, the controller may determine focusing waveforms to be emitted by at least two pressure sources of the tool such that the focusing waveforms are focused at the one or more predetermined positions to generate seismic waveforms at those positions with a desired magnitude that is sufficient to cause localized seismo-electromagnetic conversion at the one or more predetermined positions and at the corresponding one or more predetermined points in time that may be sensed by one or more sensors.

In some applications, the controller may determine the focusing waveforms via an iterative process or inversion process such as a Marchenko focusing scheme in which the reflected signals are used to iteratively update the focusing waveforms (e.g., focusing functions) until the focusing waveforms converge to provide the desired focusing of the waveforms at the one or more predetermined positions within the medium. In this manner, this focusing approach may utilize one-sided seismic illumination (from the pressure sensor(s) on the tool) and one-sided reflection data to determine the focusing waveforms. Similar to the embodiments discussed above, once the controller determines the focusing waveforms, the controller may operate the pressure sources to emit acoustic and/or elastic energy according to the focusing waveforms to focus the acoustic and/or elastic energy and generate localized seismo-electromagnetic conversion at the one or more predetermined positions within the medium. While Marchenko focusing is described herein, other focusing schemes, such as focusing based on the Common Focus Point scheme, and/or any other appropriate focusing scheme may be used as the disclosure is not limited in this fashion.

It should be understood that the current disclosure is not limited to systems and methods that focus acoustic and/or elastic energy at one or more points within a medium. Instead, the one or more predetermined positions in the medium discussed above may correspond to three-dimensional regions, surfaces, regions, curves, lines, points, and/or any other suitable geometries at which acoustic and/or elastic energy may be focused. Additionally, it should be understood that the disclosed methods and systems may focus and measure responses from individual points sequentially and/or they may focus on and measure responses from a plurality of points simultaneously as the disclosure is not limited in this fashion.

Depending on the particular embodiment, a drilling system may include any suitable type of pressure sources configured to generate acoustic and/or elastic waves in a medium. The sources may be configured to generate waves having seismic frequencies (e.g., between about 10 Hz and about 100 Hz), sonic frequencies (e.g., between about 800 Hz and about 80 kHz), ultrasonic frequencies (e.g., between about 50 kHz and about 2 MHz), or other frequency ranges, such as between about 100 Hz and about 800 Hz. Moreover, the pressure sources may be configured to provide focusing over a focusing distance of up to about 50 m, up to about 100 m, up to about 200 m, up to about 300 m or more ahead of a drill bit during a drilling operation. In some instances, higher frequency signals may provide higher resolution information regarding the medium, but may be limited to shorter focusing distances. Accordingly, an appropriate frequency bandwidth may be selected based on the desired resolution and focusing distances for a particular drilling and/or measurement operation. Moreover, it should be understood that the pressure sources are not limited to generating any particular type of acoustic and/or elastic waves. For instance, the pressure sources may be used to generate fast pressure waves, slow pressure waves, shear waves having different polarities (e.g., SV (vertically polarized) or SH (horizontally polarized) waves), and/or any combinations of such elastic waves. In addition to the above, depending on the particular embodiment, suitable pressure sources may include monopole sources, dipole sources, and/or quadrupole sources.

In some embodiments, suitable pressure sources may include downhole seismic sources, such as pneumatically powered sources, and/or electrode-based sources which generate a pressure pulse by vaporizing liquid between a pair of electrodes with a high voltage spark. Such electrode-based sources are commercially available, for example, from Avalon Sciences, Ltd. or Gisco. Of course it should be understood that any appropriate type of pressure source(s) capable of generating the desired acoustic and/or elastic waves in a medium may be used with the various embodiments disclosed herein as the disclosure is not limited to any particular type of pressure source.

As discussed above, a system may include one or more sensors positioned within a tool at an end of a drill string configured to detect electromagnetic signals generated from localized seismo-electromagnetic conversion within a medium. Thus, depending on the particular embodiment, the one or more sensors may be configured to detect one or more of an electric field, an electrical potential, a magnetic field, a magnetic flux, and/or any other parameter of the generated electromagnetic signal. For example, in some instances, the sensors may include electrodes and/or coils configured to detect an electric field from the seismo-electric conversion. In one such embodiment, pairs of electrodes may be arranged to detect an electrical potential difference corresponding to an electric field in the medium. Alternatively or additionally, the sensors may include magnetometers configured to detect magnetic fields from seismo-electric conversion. In some applications, multiple sensors (such as multiple electrodes or pairs of electrodes) may be arranged in an array within the tool, which may facilitate recording of a shot record of a seismo-electromagnetic signal corresponding to a single shot of focused acoustic and/or elastic energy. Specifically, the shot record may allow recording of signal variations corresponding to different spatial locations within the single shot. Moreover, in some instances, an array of sensors may provide enhanced signal strength resulting via stacking operations, which may provide an enhanced signal-to-noise ratio for one or more signals of interest.

In addition to the above, some embodiments described herein may employ one or more pressure sensors positioned within a tool at an end of a drill string that are configured to measure acoustic and/or elastic signals from the medium. Suitable pressure sensors include, but are not limited to borehole receivers such as geophones and hydrophones, though any appropriate sensor capable of sensing a desired pressure signal may be used as the disclosure is not limited in this fashion. Depending on the particular embodiment, the pressure sensor(s) may be configured to measure various types of acoustic and/or elastic signals, such as pressure waves and/or shear waves.

While some embodiments described herein may include two or more pressure sources within a tool to generate focused acoustic and/or elastic energy, other embodiments may employ only one pressure source, yet may still be able to achieve a desired level of focusing to generate localized seismo-electromagnetic or seismo-electric conversion at one or more predetermined positions within the medium. Accordingly, some embodiments according to the present disclosure may include one or more pressure sources. Moreover, while some embodiments described herein are discussed in connection with drilling systems and related contexts, it should be understood that the presently disclosed technology may have applications outside of such contexts. For example, in some instances, the some aspects of the current disclosure, such as the focusing methods and related systems may be used in medical imaging applications.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic representation of one embodiment of a drilling system 100, including a tool 102 configured to be positioned at an end of a drill string 104 adjacent a drill bit 106. As illustrated, the drill string 104 may be supported by a support structure 108 (e.g., a derrick or other suitable structure) and the drill string may extend into a borehole 110 formed in a medium 112. Depending on the particular type of drilling operation, the drilling system may include conventional drilling equipment 114 such as one or more conventional pumps, motors, storage tanks, and so on, as are known in the art.

The tool 102 may include two or more pressure sources 116 configured to emit acoustic and/or elastic energy into the medium 112 surrounding the borehole 110. For example, a tool with three pressure sources 112 is shown in FIG. 1, however, it should be understood that the tool could have only two pressure sources, or more than three pressure sources. As noted above, in some instances, the tool may have only one pressure source. Moreover, in some instances, a tool 102 may include two or more different types of pressure sources. For example, a first type of pressure sources may be configured for forming focused acoustic energy at one or more predetermined positions 150 within the medium 112, and a second type of pressure source may be configured to generate reflected acoustic and/or elastic waves in the medium. In some applications, such a second type of pressure source may generally emit stronger acoustic and/or elastic energy waves into the medium 112 relative to the first type of pressure sources. In other instances, a tool may include only a single type of pressure source 116, and the pressure sources may be operated as desired to form focused acoustic and/or elastic waveforms and/or to generate reflected acoustic and/or elastic signals from the medium 112. As discussed above, the pressure sources 116 may include any suitable type of seismic, sonic, and/or ultrasonic pressure sources configured to emit acoustic and/or elastic waves having a frequency between about 10 Hz and about 2 MHz or any other appropriate frequency range.

The tool 102 may further include one or more, and in the depicted embodiment two, sensors 118 and 120 configured to detect electromagnetic signals from the medium 112, which may result from seismo-electromagnetic conversion within the medium. For example, the sensors may detect an electromagnetic signal emitted from the one or more predetermined positions 150 ahead of the drill bit 106. For example, a first type of sensor 118 such as a pair of electrodes and/or coils may be configured to detect a first type of electromagnetic signal such as an electrical potential and/or an electric field, while a second type of sensor 120 such as a magnetometer (e.g., a quantum magnetometer) may be configured to detect a second type of electromagnetic signal such as a magnetic flux and/or a magnetic field. While the depicted embodiment includes two types of sensors, it should be understood that the current disclosure is not limited to any particular number and/or type of sensors, and in some instances, a tool may include only one type of sensor (such as electrodes to measure an electrical potential). Moreover, as discussed above, in some embodiments, the tool may include a plurality of sensors arranged in an array, which may aid in signal acquisition and/or provide an improved signal to noise ratio. Additionally, the sensors 118 and 120 may include amplifiers (not depicted) configured to amplify an electromagnetic signal detected by the sensors.

As discussed above, in some instances, a tool may be configured to generate acoustic and/or elastic reflections from a medium, for example, to further refine a preexisting model of the medium (e.g., through data assimilation) and/or as part of a data-driven focusing scheme such as Marchenko focusing. In such embodiments, the tool 102 may further include one or more pressure sensors 122 (e.g., hydrophones and/or geophones) configured to detect the reflected acoustic and/or elastic signals.

The various pressure sources 116, sensors 118 and 120, and pressure sensors 122 of the tool 102 may be operatively coupled to a controller 124 that may be configured to control the operation of these various components, as well as the drill bit 106 and the drilling equipment 114. For example, as discussed in more detail below, the controller may be configured to control the tool 102 to generate focused seismo-electromagnetic conversion a the one or more predetermined positions 150 and, and the controller may be configured to control one or more aspects of a drilling operation based on the electromagnetic signals detected by the sensors 118 and/or 120 of the tool 102. In the depicted embodiment, the controller 124 is positioned outside of the borehole 110, and may communicate with the tool in any suitable manner, such as via a wired connection though the drill string 104 and/or via a wireless communication protocol. In other embodiments, one or more controller components may be positioned within the drill string 104, such as within the tool 102.

While the tool 102 shown in FIG. 1 depicts a particular arrangement or pressure sources 116, sensors 118 and 120, and pressure sensors 122, it should be understood that the current disclosure is not limited to any particular configuration for such features within the tool. Accordingly, a tool 102 may include any suitable number of such features arranged in any suitable manner.

Referring now to FIG. 2, one approach for determining waveforms to be emitted by two or more pressure sources 116 of a tool 102 to generate focused acoustic and/or elastic energy at one or more predetermined positions 150 is described in more detail. The depicted approach uses time-reversal focusing whereby propagation of acoustic and/or elastic waves 152 from the one or more predetermined positions 150 is calculated based on a preexisting model of the medium, such as a velocity model obtained based on full-waveform inversion of surface-acquired seismic data, direct measurements of reflected waves from the medium (as discussed below), and/or any other suitable modeling approach. A controller of a drilling system (e.g., controller 124 shown in FIG. 1) may calculate the propagation of the waves 152 through the medium 112 based on the model and determine modeled signals at positions of each pressure source 116 within the tool. The controller may then time-reverse the modeled signals at the position of each pressure source to obtain a time-reversed signal for each pressure source 116, which may be emitted from the pressure sources as discussed below.

FIG. 3 depicts a tool 102 configured to generate reflected acoustic and/or elastic signals from a medium 112, according to some embodiments. As illustrated, one or more pressure sources 116 may be controlled (e.g., via a controller such as controller 124 shown in FIG. 1) to emit acoustic and/or elastic waves 154 into the medium 112, and the emitted waves 154 may generate reflected acoustic and/or elastic waves 156. These reflected acoustic and/or elastic waves may subsequently be measured by one or more pressure sensors 122 positioned on the tool 102. For example, as discussed previously, the pressure sensors 122 may include one or more of geophones, hydrophones, and/or other types of pressure sensors. Depending on the particular embodiment, the measured reflected acoustic and/or elastic waves may be used to generate and/or refine a model of the medium 112 for use with time-reversal focusing, and/or the reflected signals may be used as a part of a data-driven focusing scheme such as Marchenko focusing whereby the reflected signals are used to iteratively determine focusing waveforms to be emitted by one, or two or more, pressure sources to achieve focusing of acoustic and/or elastic energy at one or more predetermined positions 150 within the medium 112.

Figure 4:
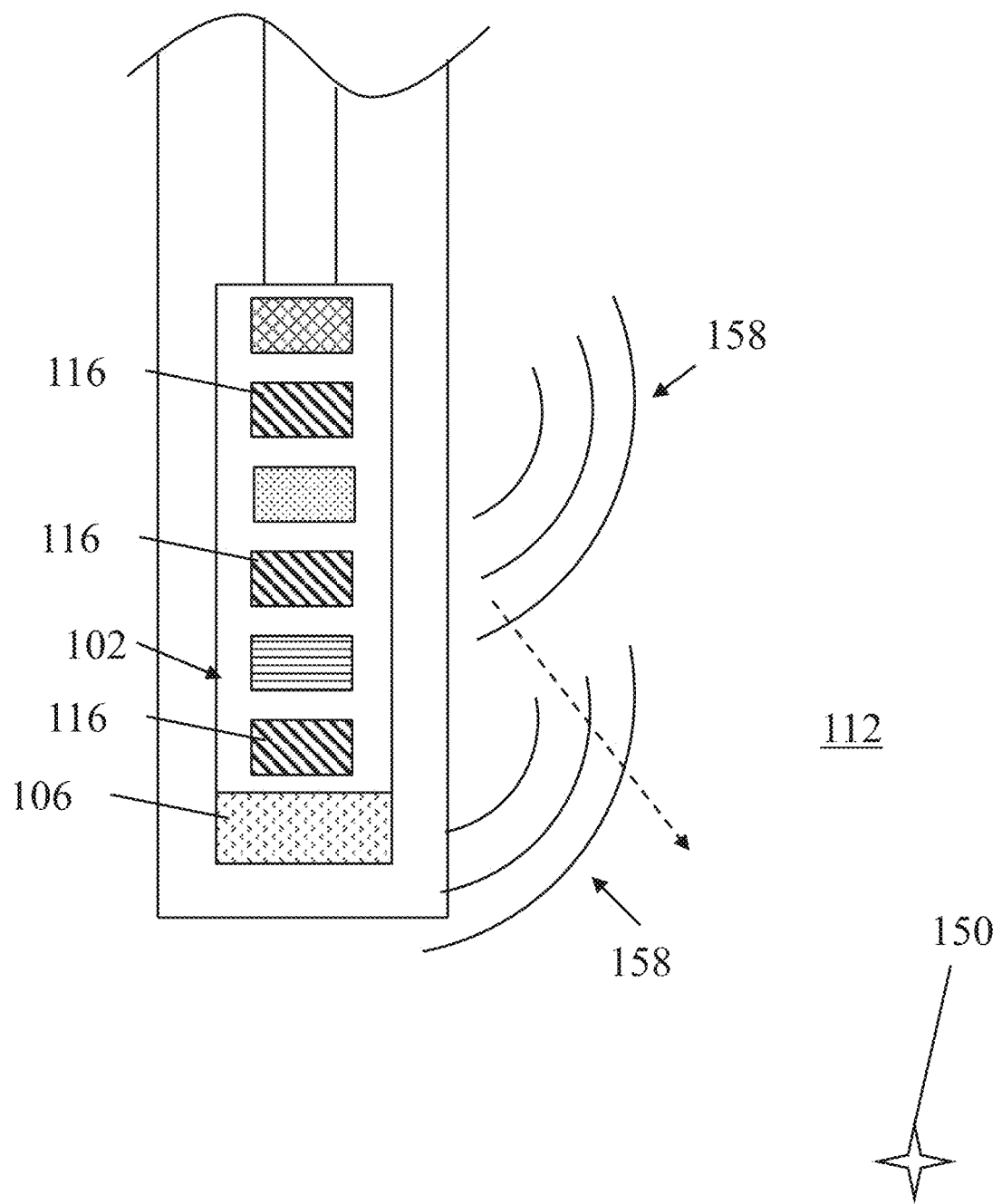
FIG. 4 is a schematic representation of a portion of a drilling system illustrating seismic waves emitted from a tool that interact with one another to focus at a predetermined position, according to some embodiments.

As shown in FIG. 4, once appropriate waveforms are obtained to achieve focusing at one or more desired positions 150 in a medium 112, a controller (not depicted) may control two or more pressure source 116 to emit focusing waveforms 158 such that the waveforms form a locus of focused acoustic and/or elastic energy at the one or more predetermined positions 150 with a desired magnitude. For example, the controller may operate the pressure sources 116 to emit acoustic and/or elastic energy according to time-reversed signals obtained for each pressure source 116 and/or based on focusing waveforms obtained via a data-driven focusing scheme such as Marchenko focusing. In this manner, the emitted acoustic and/or elastic energy may propagate through the medium 112 and interact (e.g., via wave interference, scattering, and/or reflections in the medium) to achieve focused acoustic and/or elastic energy at the one or more predetermined positions 150. As discussed above, the focused acoustic energy may generate localized seismo-electromagnetic conversion at the one or more predetermined positions, which in turn may be detected via sensors positioned within the tool 102.

Figure 5:
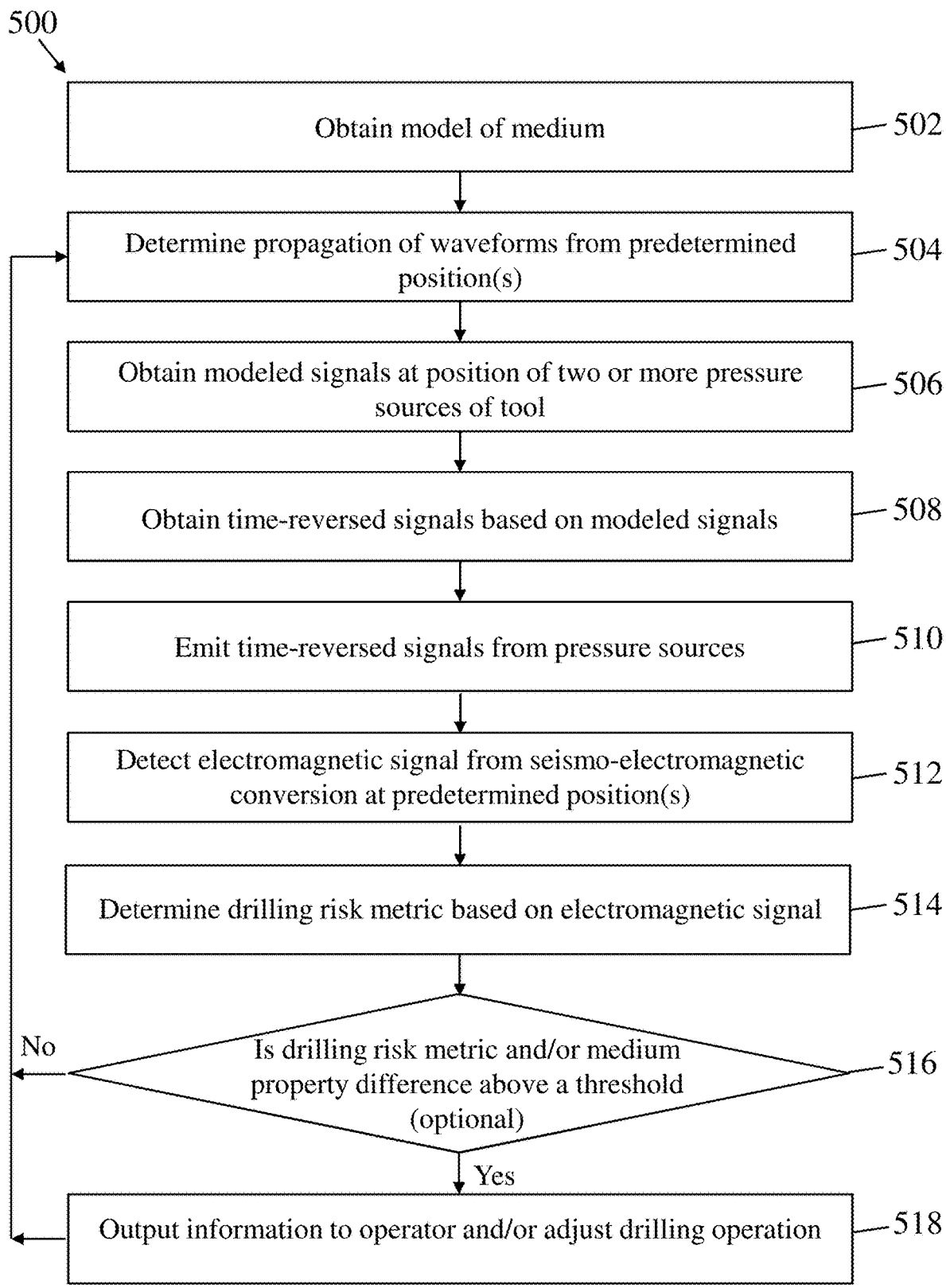
FIG. 5 is a flow chart depicting one embodiment of a method for generating focused seismo-electromagnetic conversion.

Referring now to FIG. 5, one embodiment of a method 500 that may be practiced in connection with the disclosed drilling systems is described in more detail. At step 502, a model of a medium may be obtained. As discussed above, the model may be a preexisting model of the medium, such as an acoustic and/or elastic velocity model. Moreover, as noted above, in some instances, a model may be obtained, or a preexisting model may be refined, by measuring reflected acoustic and/or elastic signals from the medium using one or more pressure sensors in a tool positioned at an end of a drill string. Using the model, propagation of acoustic and/or elastic waveforms with predetermined magnitudes through the medium from one or more predetermined positions may be determined at step 504. Such propagation may be calculated using the model, and based on the modeled propagation, modeled signals may be determined at positions of two or more pressure sources of the tool at step 506. For example, the modeled signal may be a pressure signal over time at the positions of the pressure sources corresponding to acoustic and/or elastic energy with originating at the predetermined position(s). At step 508, the modeled signals are time-reversed to obtain time-reversed signals for each of the pressure source, and at step 510 acoustic and/or elastic energy is emitted from each of the two or more pressure sources according to the time-reversed signals. In this manner, the emitted energy may propagate through the medium towards the predetermined position(s) and focus at the predetermined position(s) via interactions of the emitted acoustic and/or elastic energy from each pressure source.

The focused acoustic and/or elastic energy may cause localized seismo-electromagnetic conversion at the one or more predetermined positions, which may cause an electromagnetic signal to be emitted from the one or more predetermined positions. At step 512, the signal is detected, for example, by one or more sensors positioned within the tool of the drilling system. Based on the detected signal, a drilling risk metric may be determined at step 514. For example, the drilling risk metric may be based on a comparison of the detected signal to an expected signal from the one or more predetermined positions. In some instances, if the detected signal is similar to the expected signal, the drilling risk metric may indicate a lower risk relative to a comparison that reveals a larger difference between the detected signal and the expected signal. For example, thresholding of the signal difference may be used to differentiate between different higher and lower risk metrics in some embodiments. Alternatively or additionally, the drilling risk metric may be based on one or more properties of the medium at the predetermined position(s) that may be inferred from a value of the detected electromagnetic signal. At 516 a system may optionally determine if the drilling risk metric or a difference from an expected medium property is sufficient to warrant additional actions. For example, the drilling risk metric and/or medium property difference may be compared to one or more thresholds. If the determined risk metric and/or medium property difference is low (e.g., below a threshold value), the method may return to step 504 and the system determine a drilling risk metric and/or medium property difference associated with one or more new predetermined positions based on modeled propagation from one or more new positions. Alternatively, if the drilling risk metric and/or medium property difference is high (i.e. greater than a threshold value), the method 500 may further include outputting information such as the drilling risk metric, the detected medium property, and/or the difference from an expected medium property, and/or any other appropriate information to an operator in the form of an alert or alarm at 518. Alternatively or additionally, a controller of the system may adjust one or more parameters of a drilling operation based on the drilling risk metric and/or medium property difference as also indicated at step 518. For example, a visual, audible, and/or vibrotactile alert may be output to an operator of the drilling system. Various aspects of a drilling operation that may be adjusted are described in more detail below. After outputting the drilling risk metric and/or adjusting the drilling operation, the method may return to step 504 and proceed with one or more new predetermined positions as noted above.

Figure 6:
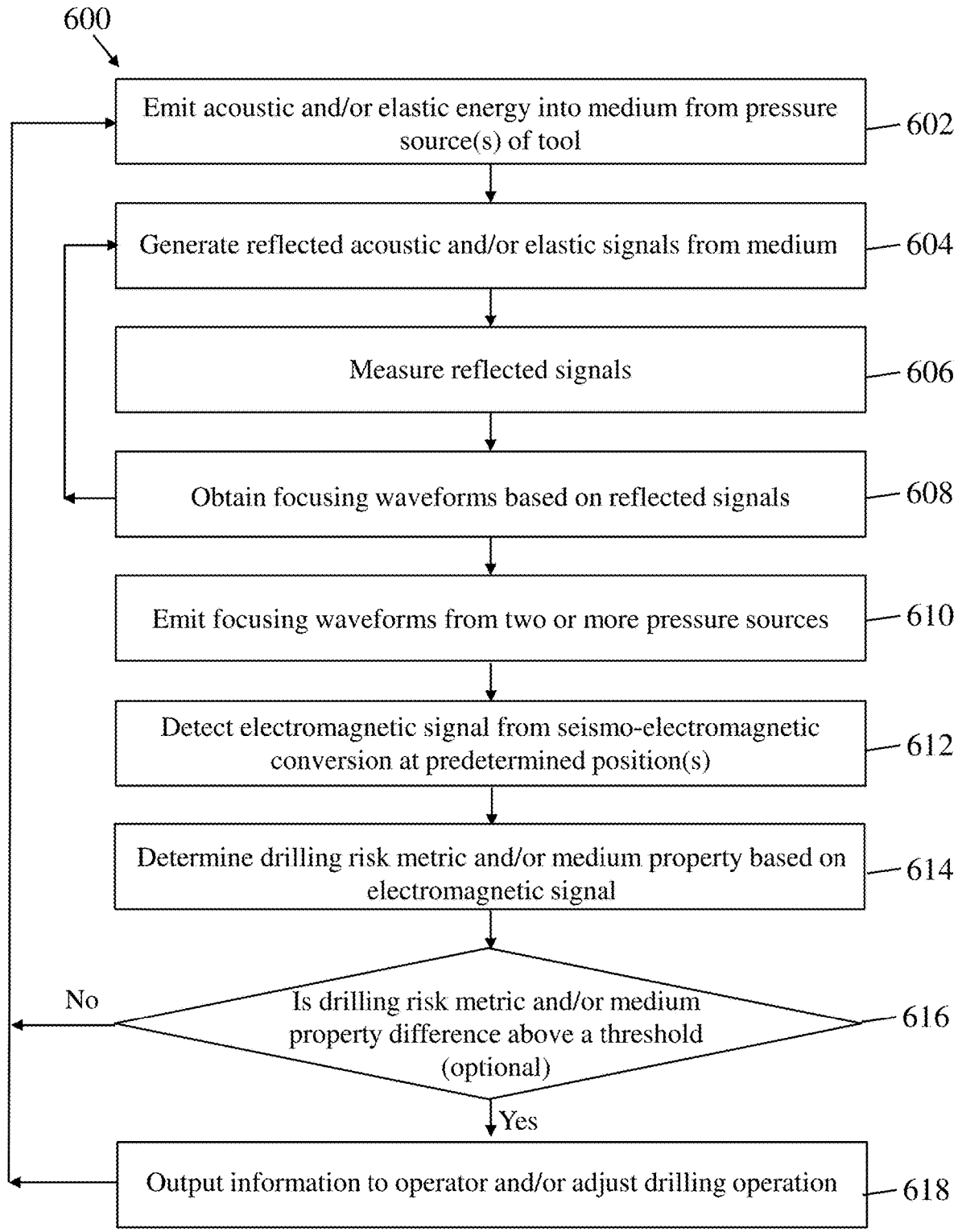
FIG. 6 is a flow chart depicting another embodiment of a method for generating focused seismo-electromagnetic conversion.

Referring now to FIG. 6, another embodiment of a method 600 that may be practiced in connection with the disclosed drilling systems is described in more detail. At step 602, acoustic and/or elastic energy is emitted into a medium from at least one pressure source of a tool positioned at an end of a drill string, and at step 604, the emitted acoustic and/or elastic energy generates reflected acoustic and/or elastic signals from the medium. Some of the reflected signals may be directed towards the tool and may be measured by one or more pressure sensors on the tool as shown at step 606. At step 608, the reflected signals may be used to determine focusing waveforms to be emitted from each of two or more pressure sources such that the focusing waveforms focus at one or more predetermined positions within a medium to generate a desired acoustic and/or elastic waveform at the one or more predetermined positions. As noted above, the focusing waveforms may be determined based on a focusing scheme, such as Marchenko focusing. Moreover, as illustrated, steps 604, 606, and 608 may be repeated in an iterative process to obtain the desired focusing waveforms. For example, the iterative process may be repeated until converged focusing waveforms are obtained based on the reflected signals. While an iterative process is described in connection with FIG. 6, in other embodiments, Marchenko focusing waveforms may be determined based on an inversion scheme.

Similar to the embodiment described above in connection with FIG. 5, once the focusing waveforms are obtained, the focusing waveforms may be emitted from two or more pressure sources of the tool, as shown at step 610. Focusing of acoustic and/or elastic energy at the one or more predetermined positions may cause localized seismo-electromagnetic conversion at the predetermined positions, which may cause an electromagnetic signal to be emitted from the predetermined positions. At step 612, the signal is detected, for example, by one or more sensors positioned within the tool of the drilling system. Based on the detected signal, a drilling risk metric and/or medium property difference may be determined at step 614, and may be based on, for example, a comparison of the detected signal to an expected signal and/or based on a medium property inferred from the detected signal. Similar to the above-described embodiment, at 616, if the drilling risk metric and/or medium property difference is low (e.g., below a threshold value), the method may return to step 602 and proceed to determine a drilling risk metric and/or medium property difference associated with one or more new predetermined positions within the medium. Alternatively, if the drilling risk metric and/or medium property difference is high, the method 600 may further include outputting the drilling risk metric, the medium property, and/or medium property difference to an operator and/or a controller of the system may adjust one or more parameters of a drilling operation as indicated at step 618. After outputting the desired information to an operator and/or adjusting the drilling operation, the method may return to step 602 and proceed with measuring one or more new predetermined positions as noted above.

As noted above, in some instances, the systems and methods described herein may be used to adjust one or more aspects of a drilling operation based on a drilling risk metric, or other sensed or determined parameter, obtained using a localized seismo-electromagnetic conversion signal at one or more positions in a medium ahead of a drill bit. Such adjustment may be automatically performed by a drilling system, for example, via commands issued by a controller to one or more components of the system. However, in some instances, upon identifying a high drilling risk metric, a large difference in a medium property as compared to an expected medium property, a particular material property of the medium, and/or any other appropriate condition (such as an unexpectedly strong spatial variability of a medium), a controller of a drilling system may stop a drilling operation. Alternatively or additionally, a controller may output the drilling risk metric, or other appropriate condition related to the sensed signals, to an operator. This output of the drilling risk metric may include suggested adjustments for the operating parameters of the drilling system based on the drilling risk metric, including stopping or modifying the speed or schedule of drilling operations. The adjustments may then be made manually by the operator. Exemplary aspects and/or parameters of a drilling operation that can be adjusted either manually by an operator and/or automatically by a controller of the system may include, but are not limited to, a drilling pathway or course through the medium, a drill speed, applied torque, and/or a mud weight. However, it should be understood that the current disclosure is not limited to any particular adjustments to a drilling operation.

Example: Modeling of Focusing Methods

As noted above, some aspects described herein relate to generating localized seismo-electromagnetic conversion within a medium, such as at positions ahead of a drill bit.

According to some examples, seismo-electromagnetic conversion can be described in connection with various theoretical frameworks, as discussed below.

Seismo-electromagnetism results from natural coupling interactions that occur when a seismic wave propagates through a porous medium containing fluid in the pore space. According to The electro-kinetic origin of this coupling is rock-fluid interactions on the microscale, with an electrical double layer (that may depend on temperature) being the major factor. Typically, two types of seismoelectric coupling are distinguished: coupling propagating with seismic velocity (the coseismic field); and coupling at an interface with a contrast in medium properties, or at an arbitrarily shaped heterogeneity of sufficient size relative to the dominant wavelength. This second type of coupling creates a seismo-electric conversion field, an electromagnetic field generated by asymmetry in charge distribution related to the heterogeneity of the medium.

The seismo-electromagnetic effect may be theoretically described for arbitrary, inhomogeneous, fluid-saturated porous media in terms of a coupling between Biot's poroelasticity equations and Maxwell's electromagnetic equations. One approximation that can be applied to this theoretical formulation of the seismo-electromagnetic effect is the low-frequency quasi-static approach for the electromagnetic fields i.e., when the electric and magnetic parts are not coupled to each other and the magnetic part may be weak and/or slow. The Maxwell-Faraday equation then implies an irrotational electric field that can be written as the negative gradient of an electric potential:

$$E = -\nabla \psi \quad (1)$$

The highest frequency that validates this approximation depends on the measurement configuration and the target depth. In particular, the target of interest should be close enough to receivers (e.g., electromagnetic sensors) so that the time required by the electromagnetic converted fields to diffuse between the target and measurement devices is negligible. Since seismo-electromagnetic fields are sensitive to many medium properties e.g., porosity, pore-fluid viscosity (which is sensitive to temperature), intrinsic permeability, saturation gradient, mineral content, capillary pressure, and electrical conductivity simplified theoretical formulations are useful for enhanced understanding, as well as inversion.

An additional acoustic approximation on the mechanical side of the system can be introduced, which leads to an acousto-electric formulation, where the pore pressure $$p = BP \quad (2)$$

is coupled to acoustic pressure waves P via the Skempton coefficient $$B = \frac{1 - K/K_u}{1 - K/K_s}$$

and via Darcy's law $$u = -\frac{k}{\eta} \nabla p,$$

Ohm's law for the total current density $$j = \sigma E + j_s$$

and charge conservation (quasi-static continuity from the divergence of Ampere's law)

$$\nabla \cdot j = 0 \qquad (3)$$

to a Poisson equation-like elliptic (because σ>0) partial differential equation $$\nabla \cdot (\sigma \nabla \psi) = \nabla \cdot j_s \qquad (4)$$

to solve for ψ. The volumetric source current density $$j_s = \widehat{Q_v} u$$

is connected to the Darcy flow velocity u by the excess charge $\widehat{Q_v}$ contained in the pore fluid, the leading factor controlling the conversion of seismic energy to electromagnetic energy. In the above, K denotes the bulk modulus, $K_u$ the undrained bulk modulus, $K_s$ the bulk modulus of the solid phase, k the permeability, η the pore-fluid dynamic viscosity and σ the rock electrical conductivity. Equation (2) may be replaced using the "effective stress" concept when values of effective stress, confining stress, and "Biot coefficient" are known or can be estimated. In this acousto-electric approximation, the connection between generated electric fields and seismic pressure wavefields may be summarized as $$\nabla \cdot (\sigma \nabla \psi) = -\nabla \cdot \left( \widehat{Q_v} \frac{k}{\eta} \nabla BP \right) \qquad (5)$$

The converted field (1) strength depends on the P intensity (a function of both space and time) and several medium properties (functions of space, unless the medium fractures or otherwise experiences a time-dependent change).

Depending on the specific theoretical formulation, measured converted seismo-electromagnetic fields can be used to infer selected medium properties as shown in equations (2)-(5) above. In some instances, a more complete set of porous medium properties can be inferred with increasingly complex theoretical formulations. For example, an accurate inference of η combined with an estimation of fluid type would inform an estimation of temperature, and given an equation of state, other pore-fluid properties such as reference pressure. As another example, the absorption rate of E increases with water saturation and salinity, which may allow inferring the attenuation parameter of a formation within a medium. As a further example, in instances where a formation rock is dielectric, temperature may be inferred in connection with changes in density, or polarizability.

Referring now to FIGS. 7-10, a two dimensional computational study using one or more of the methods described herein is discussed in more detail. The depicted example is based on two dimensional synthetic modeling of acousto-electric coupling, summarized by equation (4) above. A code was developed for the acoustic part of the modeling. A 2D Poisson solver was also developed and used. The module was an explicit, direct sparse 2D finite-difference Poisson solver for media having spatially varying conductivity. The module handled the 'Forward' problem using the source $j_s$, and conductivity σ distributions to solve equation (4) for the electrical potential ψ. The module also handled the 'Inverse' problem using the wave-propagation related pore pressure (2) and mechanical medium properties to calculate the right-hand side of equation (4). The boundary value problem was implemented by assuming that Neumann conditions:

$$(n \cdot \nabla \psi)|_\Gamma = 0 \qquad (6)$$

are met at all boundaries Γ with normal vectors n.

In view of the above, integrating eq. 5 over the domain area, converting by the Gauss theorem to a boundary integral, and then applying eq. 6 may imply a consistency requirement on the source that the boundary integral: $\oint \Gamma(\hat{Q}_v k/\eta) n \cdot \nabla(BP) = 0$. Eq. (5) may then be solved such that it meets this requirement using any number of various methods including, for example, tapering $\hat{Q}_v k/\eta$ to zero near Γ or keeping Γ sufficiently far away.

Figure 8:
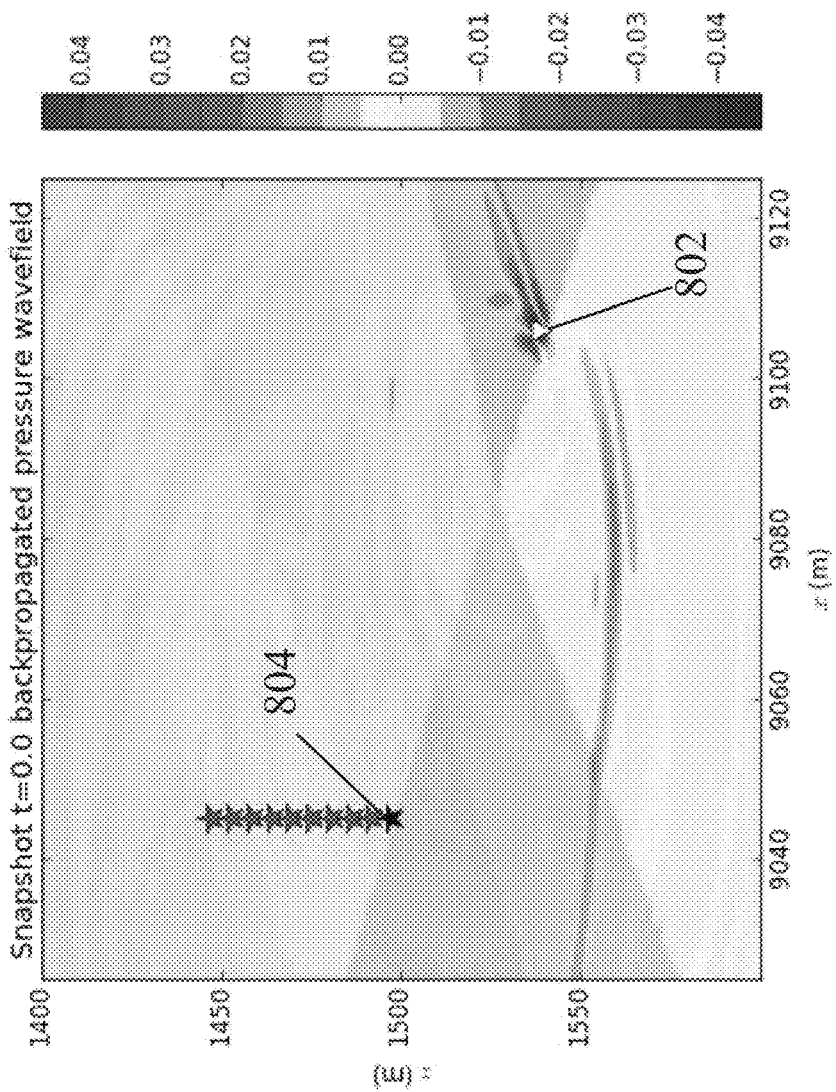
FIG. 8 is a plot showing propagation of pressure waves in a medium based on the acoustic map of FIG. 7.
Figure 7:
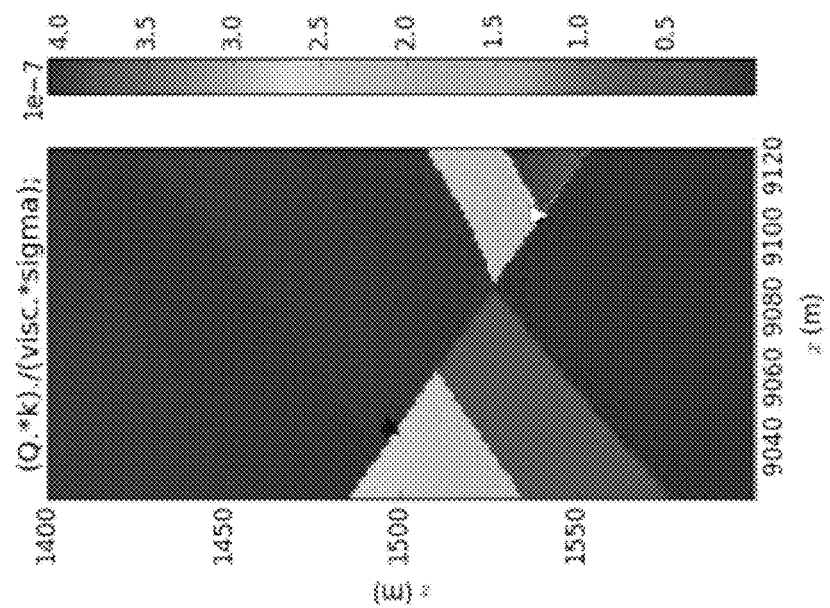
FIG. 7 is a plot showing an acoustic map of a medium, according to one example.

FIG. 7 shows an exemplary velocity model of a two-dimensional medium, which is used to simulate propagation of pressure waves within the medium, as illustrated in FIG. 8 using the above noted modeling and focusing methods and equations. In particular, FIG. 8 shows a snapshot of a pressure wavefield focused at point 802 within the medium at time t=0. Using the model shown in FIG. 7, propagation of this focused pressure wavefield may be calculated backwards in time through the medium to determine a modeled signal at positions of one or more pressure sources, such as at point 804. The modeled signal may be subsequently time-reversed such that when the time reversed signal is emitted from the pressure sources and propagated forward in time via the model, the pressure wavefield of FIG. 8 is recreated at time t=0.

Figure 9:
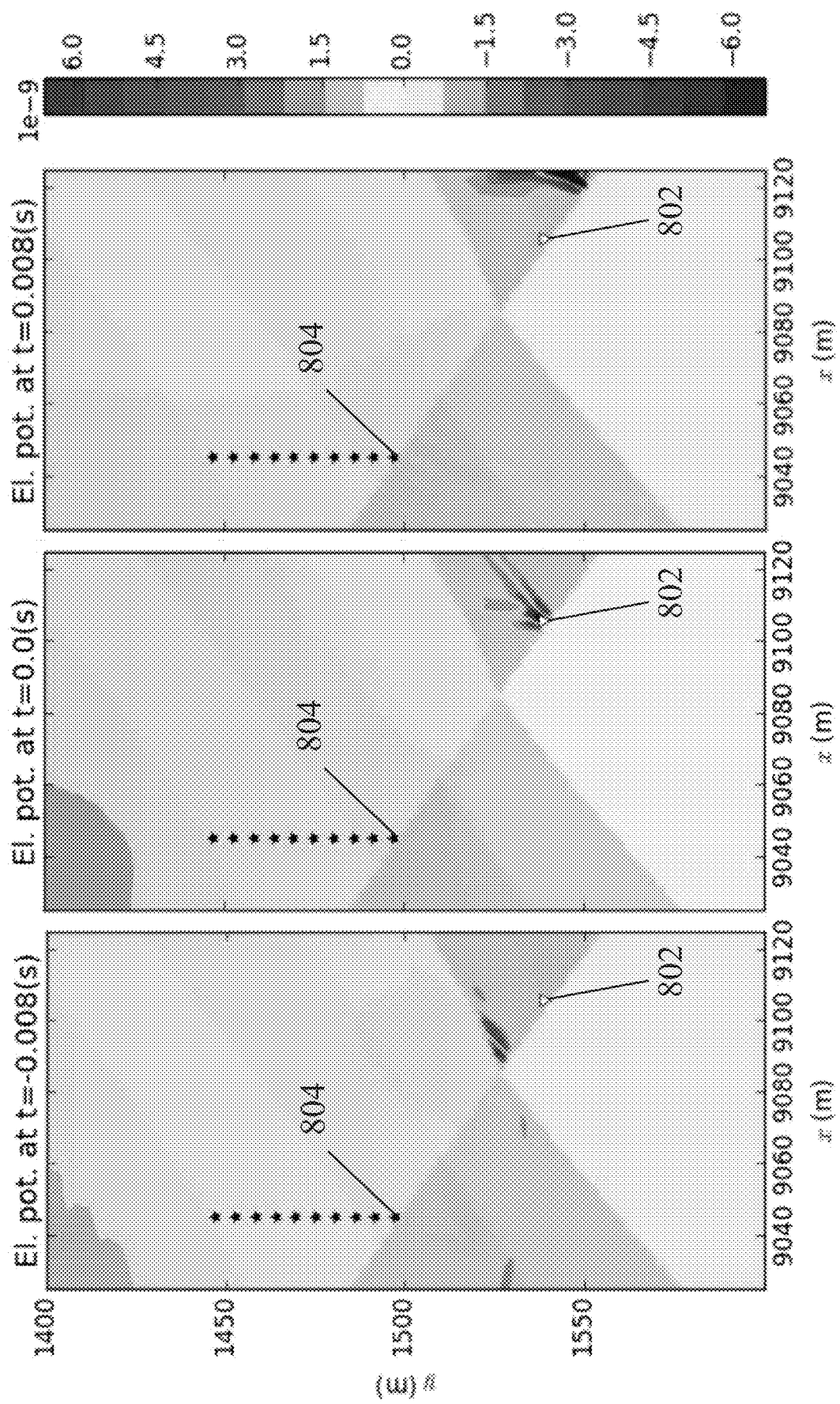
FIG. 9 depicts plots showing snapshots of the electrical potential in the medium of FIGS. 7-8 at three different times.
Figure 10:
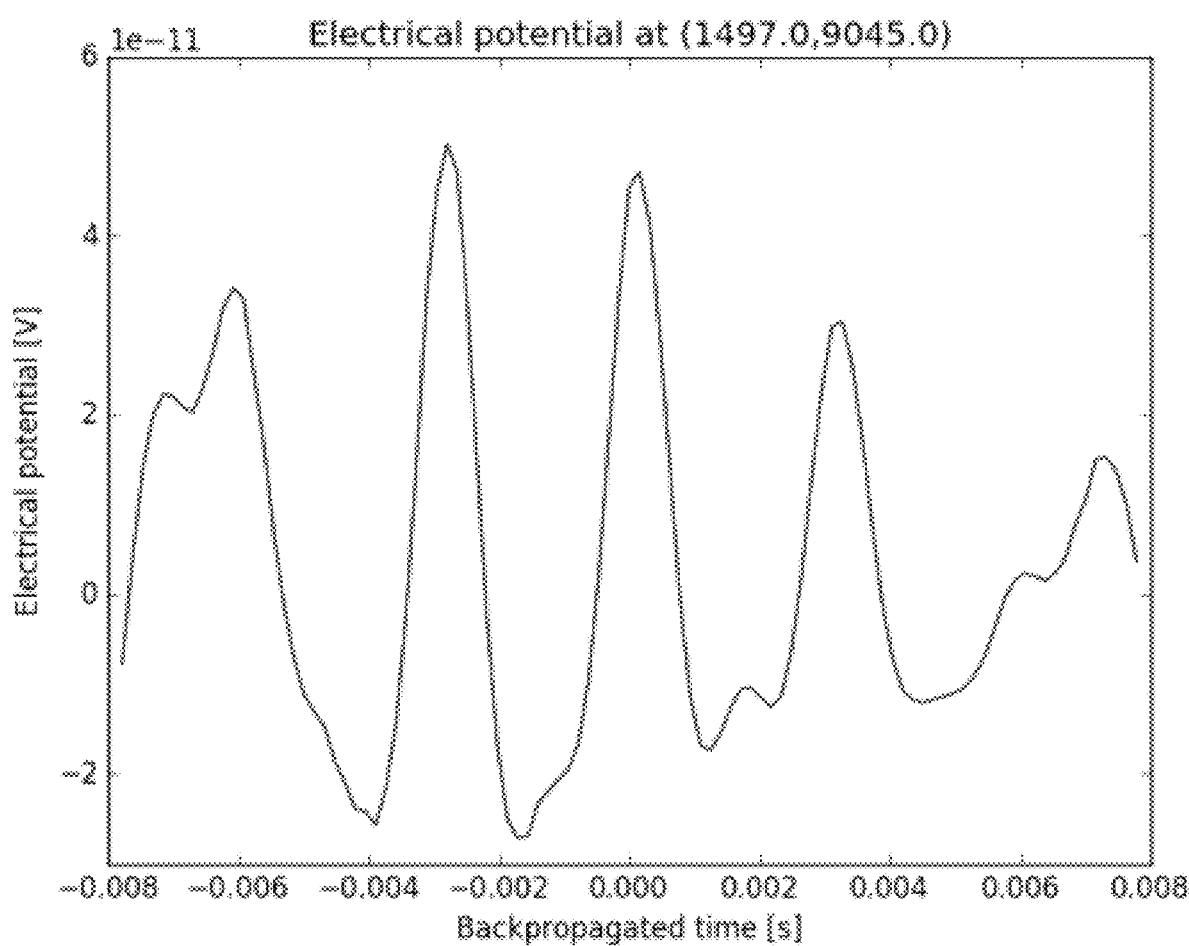
FIG. 10 is a plot of electrical potential versus time at a position of a sensor based on the plots of FIG. 9.

As shown in the time series snapshots of the electrical potential in the medium shown in FIG. 9, the focused pressure wavefield of FIG. 8 creates localized seismoelectric conversion at point 802 at different time points prior to time t=0 (left plot), at time t=0 (middle plot), and after time t=0 (right plot). FIG. 10 shows a plot of the electrical potential vs. time at point 804 in the medium.

While an acousto-electric approximation is discussed above, it should be appreciated that other formulations, including more complete formulations, such as elastic or poroelastic forumulations could also be used. Accordingly, it should be understood that the current disclosure is not limited to acousto-electric approximations of seismo-electromagnetic conversion.

The above-described embodiments of the technology described herein can be implemented in any of numerous ways. For example, the embodiments of systems and methods described herein may be implemented using hardware, software or a combination thereof. When implemented in software, the software code can be executed on a controller including any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom controller circuitry, such as an ASIC, or semicustom circuitry resulting from configuring a programmable logic device. As yet a further alternative, a processor may be a portion of a larger controller, circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a controller may be embodied in any of a number of forms, such as a rack-mounted computer, a desktop computer, a laptop computer, or a tablet computer. Additionally, a controller may be embedded in a device not generally regarded as a computer but with suitable processing capabilities, including a Personal Digital Assistant (PDA), a smart phone or any other suitable portable or fixed electronic device.

Also, a controller may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a controller may receive input information through speech recognition or in other audible format.

Such controllers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

In view of the above, in some embodiments, the models and methods disclosed herein may be stored as processor executable instructions stored in at least one non-transitory computer-readable storage medium that, when executed by at least one processor as may be included in a controller of a system, cause the at least one processor to perform the disclosed methods to obtain the desired outputs and/or determine a set of waveforms to emit from a plurality of pressure sources to focus acoustic and/or elastic energy at one or more predetermined positions.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single controller, computer, or processor, but may be distributed in a modular fashion amongst a number of different controllers, computers, or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. A drilling system comprising:
a tool configured to be positioned at an end portion of a drill string;
one or more pressure sources positioned within the tool;
a controller operatively coupled to the one or more pressure sources, the controller configured to control the one or more pressure sources to emit acoustic and/or elastic energy into a medium surrounding the tool such that the acoustic and/or elastic energy is focused at one or more predetermined positions within the medium; and
a sensor positioned within the tool, wherein the sensor is configured to detect an electromagnetic or electrostatic signal generated by seismo-electromagnetic or seismo-electric conversion at the one or more predetermined positions.

2. The drilling system of claim 1, wherein the one or more pressure sources are two or more pressure sources.

3. The drilling system of claim 2, wherein the controller is configured to determine acoustic and/or elastic energy waveforms to be emitted by each of the two or more pressure sources such that the waveforms are focused at the one or more predetermined positions within the medium.

4. The drilling system of claim 3, wherein the controller is configured such that when the controller determines the acoustic and/or elastic waveforms the controller:
determines propagation of the acoustic and/or elastic waveforms from the one or more predetermined positions towards the two or more pressure sources based on a predetermined acoustic and/or elastic model of the medium;
 obtains a modeled signal at each of the two or more pressure sources based on the propagation of the acoustic and/or elastic waveforms; and
 time-reverses the modeled signals to calculate a time-reversed signal for each of the two or more pressure sources.

5. The drilling system of claim 4, wherein the predetermined acoustic and/or elastic model of the medium is a velocity model of the medium.

6. The drilling system of claim 4, wherein the controller is configured to operate the two or more pressure sources to emit the time reversed signals into the medium to focus the acoustic and/or elastic energy at the one or more predetermined positions.

7. The drilling system of claim 3, further comprising one or more pressure sensors positioned within the drill string, wherein the two or more pressure sensors are configured to detect acoustic and/or elastic signals from the medium.

8. The drilling system of claim 7, wherein the controller is configured to determine the acoustic and/or elastic waveforms by:
 operating at least one of the two or more pressure sources to emit acoustic and/or elastic energy into the medium to generate reflected acoustic and/or elastic signals from the medium;
 measuring the reflected acoustic and/or elastic signals with the two or more pressure sensors; and
 obtaining focusing waveforms to be emitted by at least two of the two or more pressure sources based on the reflected acoustic and/or elastic signals such that the focusing waveforms are focused at the one or more predetermined positions.

9. The drilling system of claim 8, wherein the controller calculates the focusing waveforms from the reflected acoustic and/or elastic signals using a Marchenko focusing scheme.

10. The drilling system of claim 2, wherein the electromagnetic or electrostatic signal comprises at least one selected from the group of an electric field, an electrical potential, a magnetic field, and a magnetic flux.

11. The drilling system of claim 2, wherein the sensor comprises at least one selected from the group of an electrode, a coil, and a magnetometer.

12. The drilling system of claim 2, wherein the one or more predetermined positions are within 300 meters from the tool head.

13. The drilling system of claim 2, wherein the controller is configured to determine a drilling risk metric based on the electromagnetic signal detected by the sensor.

14. The drilling system of claim 2, wherein the drilling system is configured to focus the acoustic and/or elastic energy at the one or more predetermined positions at least in part via wave interference.

15. The drilling system of claim 1, wherein the tool is configured to be positioned adjacent to a drill bit.

16. A method comprising:
 determining propagation of acoustic and/or elastic waveforms from one or more predetermined positions in a medium based on a predetermined acoustic and/or elastic model of the medium;
 obtaining modeled signals at locations of one or more pressure sources based on the determined propagation of acoustic and/or elastic waveforms, wherein the one or more pressure sources are positioned within a tool;
 time-reversing the modeled signals to calculate a time-reversed signal for each location of the one or more pressure sources; and
 emitting the time-reversed signal from each of the one or more pressure sources to generate focused acoustic and/or elastic energy at each of the one or more predetermined positions.

17. The method of claim 16, wherein the one or more pressure sources are two or more pressure sources.

18. The method of claim 17, wherein the tool is attached to an end portion of a drill string.

19. The method of claim 18, further comprising detecting an electromagnetic or electrostatic signal generated by seismo-electromagnetic or seismo-electric conversion at the one or more predetermined positions.

20. The method of claim 19, wherein the electromagnetic or electrostatic signal is detected by one or more sensors positioned within the drill string.

21. The method of claim 19, wherein the electromagnetic or electrostatic signal comprises at least one selected from the group of an electric field, an electrical potential, a magnetic field, and a magnetic flux.

22. The method of claim 19, further comprising determining a drilling risk metric based on the electromagnetic or electrostatic signal detected by the sensor.

23. The method of claim 18, further comprising obtaining the acoustic and/or elastic model of the medium.

24. The method of claim 17, wherein the acoustic and/or elastic energy is focused at the one or more predetermined positions at least in part via wave interference.

25. The method of claim 16, wherein the tool is positioned adjacent to a drill bit.

26. A method comprising:
 emitting acoustic and/or elastic energy into a medium from at least one of two or more pressure sources positioned within a tool attached to an end portion of a drill string to generate reflected acoustic and/or elastic signals from the medium;
 measuring the reflected acoustic and/or elastic signals with one or more pressure sensors positioned within the tool;
 obtaining focusing waveforms based on the reflected acoustic and/or elastic signals; and
 emitting the focusing waveforms into the medium from at least two of the two or more pressure sources to generate focused acoustic and/or elastic energy at each of one or more predetermined positions within the medium.

27. The method of claim 26, further comprising detecting an electromagnetic or electrostatic signal generated by seismo-electromagnetic or seismo-electric conversion at the one or more predetermined positions.

28. The method of claim 27, wherein the electromagnetic or electrostatic signal is detected by one or more sensors positioned within the drill string.

29. The method of claim 27, wherein the electromagnetic or electrostatic signal comprises at least one selected from the group of an electric field, an electrical potential, a magnetic field, and a magnetic flux.

30. The method of claim 27, further comprising determining a drilling risk metric based on the electromagnetic signal detected by the sensor.

31. The method of claim 26, wherein a magnitude of the acoustic and/or elastic energy emitted to generate the reflected acoustic and/or elastic signals is greater than a magnitude of the focusing waveforms.

32. The method of claim 26, wherein the tool is positioned adjacent to a drill bit.

* * * * *